United States Patent [19]

Banon

[11] 4,095,476
[45] Jun. 20, 1978

[54] SINGLE SCALE U-TYPE MANOMETER

[75] Inventor: Gabriel Banon, Paris, France

[73] Assignee: Societe Industrielle d'Etudes et de Realisations Scientifiques S.I.E.R.S., Paris, France

[21] Appl. No.: 771,390

[22] Filed: Feb. 23, 1977

[51] Int. Cl.² .............................................. G01L 7/18
[52] U.S. Cl. .................................................... 73/747
[58] Field of Search ................. 73/401, 393, 299, 397

[56] References Cited

U.S. PATENT DOCUMENTS

| | | | |
|---|---|---|---|
| 2,423,394 | 7/1947 | Lee | 73/401 |
| 3,023,622 | 3/1962 | Hezarifend | 73/401 |

Primary Examiner—Donald O. Woodiel
Attorney, Agent, or Firm—Oblon, Fisher, Spivak, McClelland & Maier

[57] ABSTRACT

A U-type manometer particularly designed for use in measuring the height of liquids of different densities held in containers which features a calibrated measuring tube, a reservoir of manometric liquid connected to the lower end of the calibrated measuring tube, a piston having an aperture therein defining two communicating chambers in the reservoir, the aperture in the piston being at a height substantially equal to the zero level of the manometric liquid in the calibrated measuring tube, a connection between the enclosure containing the liquid whose height is to be measured and the reservoir and means for moving the piston within the reservoir.

3 Claims, 2 Drawing Figures

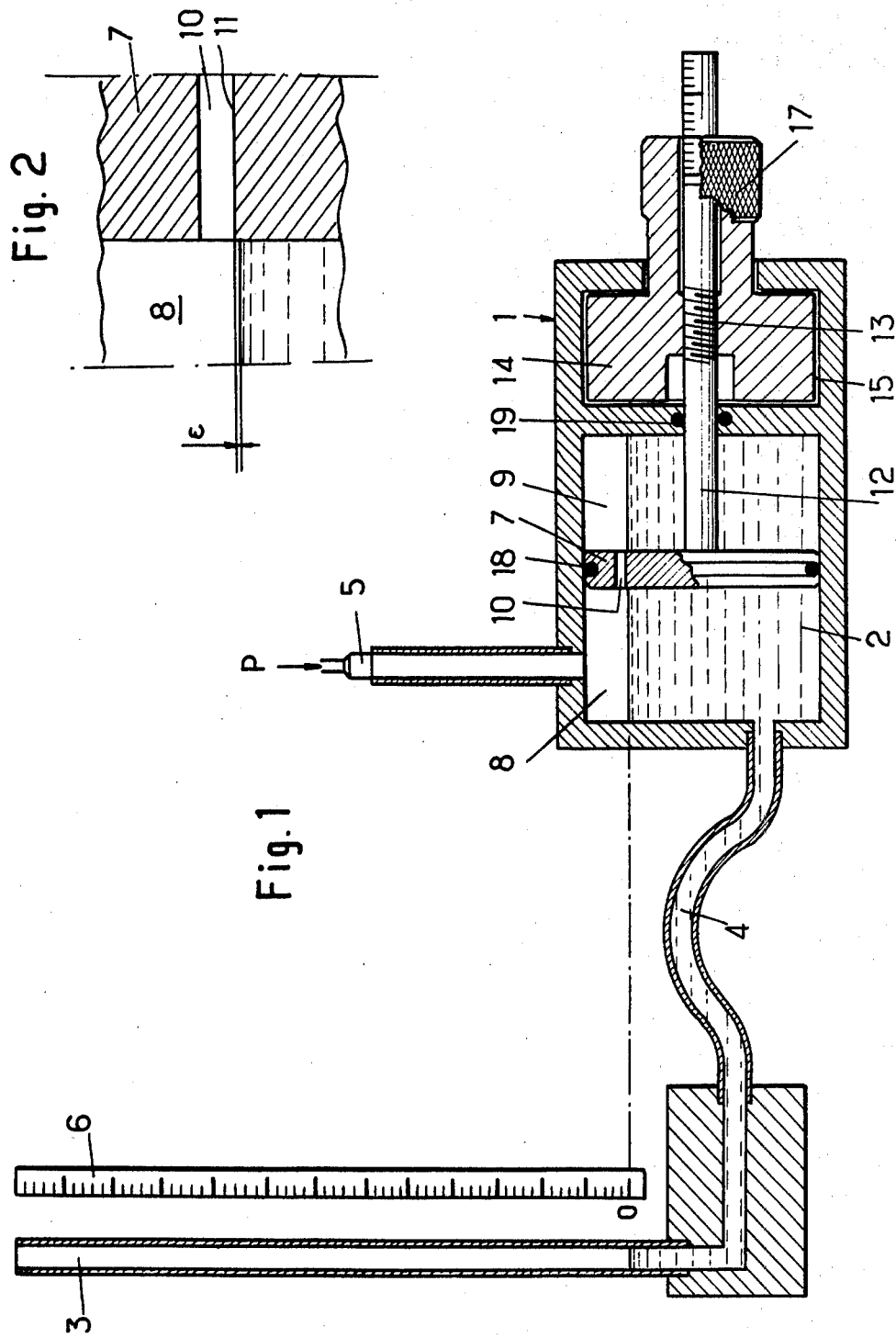

SINGLE SCALE U-TYPE MANOMETER

BACKGROUND OF THE INVENTION

1. Field of the Invention

The present invention relates to a single scale U-type manometer, particularly for use in measuring the height of liquids of different densities held in containers such as ballast-tanks or storage tanks, comprising a calibrated measuring tube, a reservoir for the manometric liquid communicating with said measuring tube, a connection with the enclosure which contains the liquid to be measured and a graduated scale.

It is known that elongation of the manometric liquid depends on the pressure being measured and on the density of the manometric liquid.

It is likewise known that the pressure corresponding to a liquid height depends on the density thereof.

Consequently, the reading on the pressure scale depends on the density of the liquid whose height is to be measured and on the density of the manometric liquid. It follows then, that when the height of liquids differing in density is to be measured with a U-type manometer, it is necessary to vary the size of the manometric scale so as to obtain different graduations for each liquid, which is very often the case when the height of fuels or liquid gases stocked in tanks is to be measured.

2. Description of the Prior Art

The possibilities known at present for varying the size of the manometric scale is to operate on the scale itself. Thus, a so-called "elastic" manometric scale is used which gives very unsatisfactory mesuring results because of its lack of accuracy.

Also used for this purpose are pivotably mounted multiple scales in the form of a pivotably and slidably mounted chart but this type of scale, apart from the difficulties that its manufacture presents, is rather inaccurate, taking into account the fact that the graduation of each scale of the multiple scale introduces a certain measuring error.

SUMMARY OF THE INVENTION

The aim of the present invention is to overcome these difficulties and to provide a manometer having a single scale for measuring the height of liquids of different densities.

To attain this aim, the present invention concerns a manometer of the above-mentioned type which is essentially characterized in that it comprises means for correcting the density of the liquid to be measured by varying the effective area of the manometric liquid.

It is understandable that with this arrangement, for a given height of liquid, the same volume of manometric liquid displaced can be maintained between the reservoir and the calibrated tube. That is to say that a constant reading height is obtained irrespective of the density of the liquid measured.

In fact, the lower the density of the liquid being measured, the lower is the transmitted pressure. This lack of pressure is then compensated for by increasing the area of the manometric liquid reservoir, so that the volume of manometric liquid displaced remains constant for a given height of liquid measured.

The density of the liquid, whose height is to be measured, is thus "corrected" by varing the effective area of the manometric liquid. It is obvious in this use that a single graduated scale is sufficient and can be very accurate, contrary to the multiple or expandable scales of the previous art.

In a preferred embodiment of the invention, the means for varying the effective area of the manometric liquid are constituted by a piston sealingly mounted in said reservoir so as to define two chambers communicating through an aperture in the piston at a height substantially equal to the zero level of the manometric liquid, means being provided for moving said piston horizontally.

Advantageously, the lower edge of said aperture in the piston is at a height slightly above the zero level of the manometric liquid.

It can easily be seen that the accuracy of the apparatus depends on the position of this opening in relation to the zero level of the manometric liquid. In fact, for complete accuracy, said aperture should coincide with zero level. However, to avoid communicating the two chambers, the aperture in the piston should be slightly higher than zero level. Naturally, the difference between zero level and the lower edge of the aperture in the piston must be the smallest possible so that the accuracy of the manometer is satisfactory.

Furthermore, the piston is integral with a rod having a threaded portion engaging with a tapped element rotatably mounted around said rod but connected to it in translation and a knurled nut is fixed on the end of said tapped element distant from the piston.

It can easily be understood that the rotation of the nut engaging with the threaded portion of the piston rod causes the horizontal movement thereof.

BRIEF DESCRIPTION OF THE DRAWINGS

An embodiment of the present application is described below, solely as a non limiting example, with reference to the accompanying drawings in which:

FIG. 1 is a longitudinal section of a manometer constructed according to the principles of the present invention; and FIG. 2 is an enlarged view of a detail of FIG. 1.

DETAILED DESCRIPTION OF A PREFERRED EMBODIMENT

The U-type manometer shown in the drawings comprises a body 1 with a manometric liquid reservoir 2 communicating with a calibrated measuring tube 3 through a communicating tube 4, a connection 5 with the enclosure containing the liquid whose height is to be measured and a graduated scale 6. The calibrated tube 3 is naturally open at its upper end and is thus subjected to a pressure, called reference pressure, generally the atmospheric pressure but which may be different in certain particular applications.

According to the present invention, the manometer comprises in addition means for correcting the liquid density by varying the effective area of the manometric liquid.

In the example shown, these means comprise a piston 7 mounted in reservoir 2 so as to define two chambers 8 and 9 communicating through an aperture 10 in the piston 7. As described above, the lower edge 11 of aperture 10 is at a height very slightly above the zero level of the manometric liquid (FIG. 2). The difference E between the lower edge 11 of aperture 10 and the zero level must be as small as possible. On the other hand, it is inadmissible for edge 11 to be below zero level.

The manometer of the invention comprises furthermore means for moving piston 7 horizontally. In the example shown in the figures, piston 7 is integral with a rod 12 having a micrometric screw 13 engaging with a tapped element 14 rotatably mounted about rod 12 and imprisoned in a housing 15 in body 1 of the manometer. A knurled nut 17 is fixed on the end distant from the piston 7 of tapped element 14.

The piston 7 is sealingly mounted in reservoir 2 by means of seals 18 and 19.

On the free end of the rod are provided graduations corresponding to the densities of the different liquids, the densities increasing from left to right as the tube retracts.

Thus, when a liquid of given density is to be measured, the knurled nut is turned in the suitable direction until the corresponding figure reaches the rear edge thereof. This causes the tapped element 14 to turn with the knurled nut 17 and, engaging with micrometric screw 13, causes piston 7 to move correspondingly towards the inside of manometric liquid reservoir 2.

Thus, the effective area of the manometric liquid varies and pressure P exerted on this area deplaces a volume which is independant of the density.

It is evident moreover that the above description of one embodiment is given solely as a non-limiting example and numerous modifications can be made without departing from the scope of the present invention.

For example, other means could be used, apart from those described, for moving the piston inside the reservoir. Moreover, if the manometer is likely to be subjected to different movements, for example the rolling of a ship, a closing valve could be advantageously provided on aperture 10 of the piston, so as to avoid a transfer of liquid between the two chambers, which would falsify the measurements. Naturally, this valve would need to be open only during adjusting periods, i.e. only when there is a change in the density of the liquid to be measured.

Finally, other means could be employed for varying the effective surface of the manometric liquid depending on the density of the liquid to be measured, for example by means of an adjustable slope of the reservoir containing said manometric liquid.

What we claim is:

1. A U-type manometer, particularly for use in measuring the height of liquids of different densities held in containers, such as ballast-tanks or storage tanks, comprising a calibrated measuring tube, a graduated scale, a reservoir of manometric liquid communicating with said measuring tube, a connection between the enclosure containing the liquid whose height is to be measured and said reservoir, a piston sealingly mounted in said reservoir so as to define two chambers therein, communicating by an aperture in the piston disposed at a height substantially equal to the zero level of the manometric liquid, and means for moving the piston horizontally within the reservoir for correcting the density of the liquid to be measured by varying the effective area of the manometric liquid.

2. A manometer according to claim 1, wherein the lower edge of said aperture in the piston is at a height slightly above the zero level of the manometric liquid.

3. A manometer according to claim 1, wherein said piston is integral with a rod having a threaded portion engaging with a tapped element rotatably mounted about said rod but translationally connected therewith, a knurled nut being fixed on the end of the tapped element distant from the piston.

* * * * *